United States Patent
Lee et al.

(10) Patent No.: US 9,967,609 B2
(45) Date of Patent: May 8, 2018

(54) METHOD AND APPARATUS FOR EXCHANGING MESSAGES AMONG EVOLVED NODE BS IN COOPERATIVE COMMUNICATION SYSTEM

(71) Applicant: Samsung Electronics Co., Ltd., Gyeonggi-do (KR)

(72) Inventors: Hyojin Lee, Gyeonggi-do (KR); Younsun Kim, Gyeonggi-do (KR); Youngbum Kim, Seoul (KR); Juho Lee, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 14/256,392

(22) Filed: Apr. 18, 2014

(65) Prior Publication Data
US 2014/0313915 A1 Oct. 23, 2014

(30) Foreign Application Priority Data

Apr. 19, 2013 (KR) ........................ 10-2013-0043307

(51) Int. Cl.
*H04W 72/12* (2009.01)
*H04B 7/02* (2017.01)
(Continued)

(52) U.S. Cl.
CPC ......... *H04N 21/4147* (2013.01); *G11B 27/32* (2013.01); *H04N 5/76* (2013.01);
(Continued)

(58) Field of Classification Search
CPC ... H04B 7/024; H04B 7/0632; H04W 72/042; H04W 72/1231
See application file for complete search history.

(56) References Cited

U.S. PATENT DOCUMENTS

2010/0173660 A1* 7/2010 Liu et al. ........................ 455/501
2011/0090861 A1* 4/2011 Kim .................... H04W 72/082
370/329
(Continued)

FOREIGN PATENT DOCUMENTS

| CN | 102907128 | 1/2013 |
|---|---|---|
| WO | WO 2013/025558 | 2/2013 |
| WO | WO 2013/055152 | 4/2013 |

OTHER PUBLICATIONS

European Search Report dated Nov. 10, 2016 issued in counterpart application No. 14786073.8-1874, 8 pages.
(Continued)

*Primary Examiner* — Scott M Sciacca
(74) *Attorney, Agent, or Firm* — The Farrell Law Firm, P.C.

(57) ABSTRACT

A method and apparatus are provided for supporting a CoMP communication by an eNB of a mobile communication system. The method includes: receiving a channel measurement report relating to at least one transmission channel from a UE; and transmitting channel feedback information including information of interference with surrounding eNBs performing the CoMP communication on the at least one transmission channel, to a central controller, based on the received channel measurement report. In the method, adjacent cells can cooperate to transmit data through a CoMP transmission for a UE located in a cell boundary area in a cellular mobile communication system.

20 Claims, 10 Drawing Sheets

(51) Int. Cl.
*H04N 21/4147* (2011.01)
*G11B 27/32* (2006.01)
*H04N 5/76* (2006.01)
*H04N 21/4335* (2011.01)
*H04N 5/781* (2006.01)
*H04N 9/804* (2006.01)
*H04N 9/82* (2006.01)
*H04N 21/47* (2011.01)

(52) U.S. Cl.
CPC ......... *H04N 21/4335* (2013.01); *H04N 5/781* (2013.01); *H04N 9/8042* (2013.01); *H04N 9/8205* (2013.01); *H04N 9/8227* (2013.01); *H04N 21/47* (2013.01)

(56) References Cited

U.S. PATENT DOCUMENTS

| | | | |
|---|---|---|---|
| 2011/0294527 A1* | 12/2011 | Brueck et al. | 455/466 |
| 2012/0122503 A1 | 5/2012 | Ma et al. | |
| 2012/0208547 A1 | 8/2012 | Geirhofer et al. | |
| 2012/0315859 A1* | 12/2012 | Lee, II | H04J 11/005 455/67.13 |
| 2012/0320775 A1 | 12/2012 | Lee et al. | |
| 2013/0040673 A1* | 2/2013 | Siomina | G01S 5/0226 455/501 |
| 2013/0077513 A1* | 3/2013 | Ng et al. | 370/252 |
| 2013/0084907 A1 | 4/2013 | Shen et al. | |
| 2013/0196675 A1* | 8/2013 | Xiao et al. | 455/452.1 |
| 2013/0288730 A1* | 10/2013 | Gomadam et al. | 455/509 |
| 2014/0092760 A1* | 4/2014 | Geirhofer | H04W 72/1226 370/252 |
| 2014/0112248 A1* | 4/2014 | Bergman | H04B 7/024 370/328 |
| 2014/0321313 A1* | 10/2014 | Seo | H04J 11/00 370/252 |
| 2015/0200755 A1* | 7/2015 | Hammarwall | H04B 7/0626 370/329 |
| 2016/0157145 A1 | 6/2016 | Brueck et al. | |

OTHER PUBLICATIONS

Chinese Office Action dated Nov. 14, 2017 issued in counterpart application No. 201480021742.0, 20 pages.
European Search Report dated Jan. 12, 2018 issued in counterpart application No. 14786073.8-1219, 8 pages.

* cited by examiner

METHOD AND APPARATUS FOR EXCHANGING MESSAGES AMONG EVOLVED NODE BS IN COOPERATIVE COMMUNICATION SYSTEM

PRIORITY

This application claims priority under 35 U.S.C. § 119(a) to Korean Patent Application No. 10-2013-0043307, which was filed in the Korean Intellectual Property Office on Apr. 19, 2013, the entire disclosure of which is hereby incorporated by reference.

BACKGROUND OF THE INVENTION

1. Field of the Invention

The present invention relates generally to a method and an apparatus for exchanging information between evolved Node Bs (eNBs) in a cellular mobile communication system including a plurality of eNBs, and more particularly, to a method and an apparatus for the efficient exchange of interference and channel information between eNBs in a Coordinated Multi-Point (CoMP) in which a plurality of eNBs support downlink transmission of a User Equipment (UE) in cooperation with each other.

2. Description of the Prior Art

From the early stage of providing voice-oriented services, mobile communication systems have evolved into high-speed, high-quality wireless packet data communication systems which provide data and multimedia services. Various mobile communication standards such as High Speed Downlink Packet Access (HSDPA), High Speed Uplink Packet Access (HSUPA), Long Term Evolution (LTE), and Long Term Evolution-Advanced (LTE-A) of the 3rd Generation Partnership Project (3GPP), High Rate Packet Data (HRPD) of the 3rd Generation Partnership Project-2 (3GPP2), and IEEE 802.16 have recently been developed to support high-speed and high-quality wireless packet data communication services.

The LTE system, which is a system developed to efficiently support high speed wireless packet data transmission, can maximize the capacity of a wireless system through the use of various wireless access technologies. Further, the LTE-A system, which is an advanced wireless system that has evolved from the LTE system, has enhanced data transmission capabilities compared to the LTE system.

The existing 3rd generation wireless packet data communication systems, such as HSDPA, HSUPA and HRPD, use technologies of an Adaptive Modulation and Coding (AMC) scheme and a channel-sensitive scheduling scheme to improve the transmission efficiency. The AMC scheme and the channel-sensitive scheduling scheme allow a transmitter to apply an appropriate modulation and coding technique at a time point determined to be most efficient, based on partial channel state information fed back from a receiver.

In a wireless packet data communication system employing the AMC scheme, a transmitter can adjust the amount of transmission data depending on a given channel state. That is, when the channel state is performing less than optimal, the transmitter can reduce the amount of transmission data to adjust the reception error probability to a desired level. In contrast, when the channel state is performing optimally, the transmitter can increase the amount of transmission data to achieve efficient transmission of a large quantity of information, while adjusting the reception error probability to a desired level.

In a wireless packet data communication system employing the channel-sensitive scheduling-based resource management method, the transmitter selectively provides a service performing optimally to a user among a plurality of users, thus increasing the system capacity compared to methods which assign a channel to one user and provide a service to the user with the assigned channel. Such a capacity increase is referred to as a multi-user diversity gain. The AMC scheme, when used together with a Multiple Input Multiple Output (MIMO) transmission scheme, may include a function of determining the rank or the number of spatial layers of a transmission signal. Here, a wireless packet data communication system employing the AMC scheme determines an optimal data rate in consideration of not only a coding rate and a modulation scheme, but also the number of layers for transmission using MIMO.

It is generally known that the Orthogonal Frequency-Division Multiple Access (OFDMA) scheme, compared to the Code-Division Multiple Access (CDMA) scheme, can increase system capacity. One of the several causes bringing about the system capacity increase in the OFDMA scheme is that the OFDMA scheme can perform scheduling on the frequency axis (e.g., frequency domain scheduling). Although a capacity gain is acquired according to the time-varying channel characteristic using the channel-sensitive scheduling method, it is possible to obtain a higher capacity gain with use of the frequency-varying channel characteristic. Recently, intensive research is being conducted to replace CDMA, the multiple access scheme used in the 2nd and 3rd generation mobile communication systems, with OFDMA in the next generation system. Further, 3GPP and 3GPP2 have started their standardizations on the evolved systems using OFDMA.

FIG. 1 illustrates a radio frame structure of an LTE-A system.

Referring to FIG. 1, one radio frame is configured by 10 sub-frames and each sub-frame is configured by two slots. Within one radio frame, the sub-frames have indexes of 0 to 9 and the slots have indexes of 0 to 9 (#0 to #19).

FIG. 2 illustrates a cellular mobile communication system according to the prior art in which a transmission/reception antenna is located at the center of each cell.

Referring to FIG. 2, in a cellular mobile communication system including a plurality of cells, a particular UE receives a mobile communication service provided using various methods described above from one cell selected in a long time period (e.g., semi-static period). For example, it is assumed that a cellular mobile communication system is configured by three cells including a cell 100, a cell 110, and a cell 120. Further, it is also assumed that the cell 100 provides a mobile communication service to a UE 101 and a UE 102 located within the cell 100, the cell 110 provides a mobile communication service to a UE 111 located within the cell 110, and the cell 120 provides a mobile communication service to a UE 121 located within the cell 120.

Among the UE 101 and the UE 102 receiving a mobile communication service in the cell 100, the UE 102 is farther from the antenna 130 than the UE 101. Further, since the UE 102 is subject to large interference from a central antenna of the cell 120, the data rate supported by the cell 100 for the UE 102 is relatively low.

When each of the cells 100, 110, and 120 independently provides a mobile communication service, a Reference Signal (RS) for channel estimation is transmitted in order to measure a downlink channel state in each cell. Further, in the case of a 3GPP LTE-A system, a UE measures a channel state between an eNB and the UE by using a Channel Status Information-Reference Signal (CSI-RS) transmitted by the eNB.

The prior art takes allocation of only one CSI-RS to a particular UE into account and does not consider a multiple CSI-RS allocation situation for CoMP transmission, thereby allowing simultaneous transmission in multiple eNBs. The prior art does not disclose an allocation method of Interference Measurement Resource (IMR) to enable a UE to measure various interference situations.

SUMMARY OF THE INVENTION

The present invention is designed to address at least the problems and/or disadvantages described above and to provide at least the advantages described below.

In the case of the conventional cellular mobile communication system shown in FIG. 1, a UE located in a boundary area of a cell is subject to large interference from another cell and is thus restricted in using a support of a high data transmission rate. That is, in the cellular mobile communication system as shown in FIG. 1, a high data transmission rate provided to each UE existing in a cell is largely influenced by the position at which the UE is located within the cell. Therefore, in the conventional cellular mobile communication system, a UE located relatively close to the center of a cell can perform transmission/reception at a high data rate but a UE located relatively far from the center of the cell cannot.

Therefore, an aspect of the present invention is to provide a method of message transmission between eNBs and an apparatus relating to the method, which can construct a simple CoMP system based on an LTE-A system and efficiently operate the constructed CoMP system.

Another aspect of the present invention is to provide a method and an apparatus, by which eNBs can exchange cooperative information with each other and each eNB can generate CSI-RS/IMR, and allocate resources to a UE by using the cooperative information, so as to enable the UE to measure multiple CSI-RS and IMR to feed back downlink channel information proper for CoMP situation.

In accordance with an aspect of the present invention, there is provided a method for supporting a CoMP communication by an evolved Node B (eNB) of a mobile communication system. The method includes: receiving a channel measurement report relating to at least one transmission channel from a User Equipment (UE); and transmitting channel feedback information including information of interference with surrounding eNBs performing the CoMP communication on the at least one transmission channel, to a central controller, based on the received channel measurement report.

In accordance with another aspect of the present invention, there is provided an eNB supporting a CoMP communication in a mobile communication system. The eNB includes: a transmission/reception unit that transmits and receives signals to and from a UE and a central controller; and a controller that controls the transmission/reception unit, receives a channel measurement report related to at least one transmission channel from the UE; and transmits channel feedback information including information of interference with surrounding eNBs performing the CoMP communication to the central controller on the at least one transmission channel based on the received channel measurement report.

In accordance with another aspect of the present invention, there is provided a UE supporting a CoMP communication in a mobile communication system. The UE includes: a transmission/reception unit that transmits and receives signals to and from at least one of a first eNB and surrounding eNBs performing the CoMP communication with the first eNB; and a controller that controls the transmission/reception unit, receives a signal through at least one transmission channel from at least one eNB among the first eNB and the surrounding eNBs performing the CoMP communication with the first eNB, and transmits a channel measurement report relating to the at least one transmission channel based on the received signal.

In accordance with another aspect of the present invention, there is provided a central controller supporting a CoMP communication in a mobile communication system. The central controller includes: a transmission/reception unit that transmits and receives signals to and from at least one eNB; and a controller that controls the transmission/reception unit and receives channel feedback information including information of interference between a first eNB and surrounding eNBs performing the CoMP communication with the first eNB, relating to at least one transmission channel through which the first eNB transmits and receives signals to and from a UE, from the first eNB.

According to an embodiment of the present invention, adjacent cells can cooperate to transmit data through a CoMP transmission for a UE located in a cell boundary area in a cellular mobile communication system. Further, in a cellular mobile communication system, the cells can provide an improved mobile communication service in comparison with the case where there is no cooperation. When a UE is located in a cell boundary area, the UE can dynamically determine a cell from which the UE is to receive data. Further, several cells determined as interference cells can turn off their own power in order to help the UE located in the cell boundary area. In addition, a plurality of cells can simultaneously transmit information to the UE located in the cell boundary area to improve the information reception rate of the UE. As a result, all UEs in a cellular mobile communication system can equally achieve a high data rate regardless of their locations in the cell.

BRIEF DESCRIPTION OF THE DRAWINGS

The above and other aspects, features and advantages of certain embodiments of the present invention will be more apparent from the following detailed description in conjunction with the accompanying drawings, in which.

DETAILED DESCRIPTION OF EMBODIMENTS OF THE PRESENT INVENTION

Hereinafter, various embodiments of the present invention will be described in detail with reference to the accompanying drawings. In the following description of the present invention, a detailed description of known functions or configurations incorporated herein will be omitted when it may make the subject matter of the present invention rather unclear. Further, terms described later are defined in consideration of the functions of the present invention, but may vary according to the intention or convention of a user or operator. Therefore, their definition will be made based on the overall contents of this specification.

Further, although the following description of embodiments of the present invention will be directed to a wireless communication system based on OFDM, especially the 3GPP Evolved Universal Terrestrial Radio Access (3GPP EUTRA) standard, it will be understood by those skilled in the art that the present invention may be applied to any other communication system having a similar technical background and channel format, with minor modifications being made, without substantially departing from the scope of the present invention.

Figure 3:
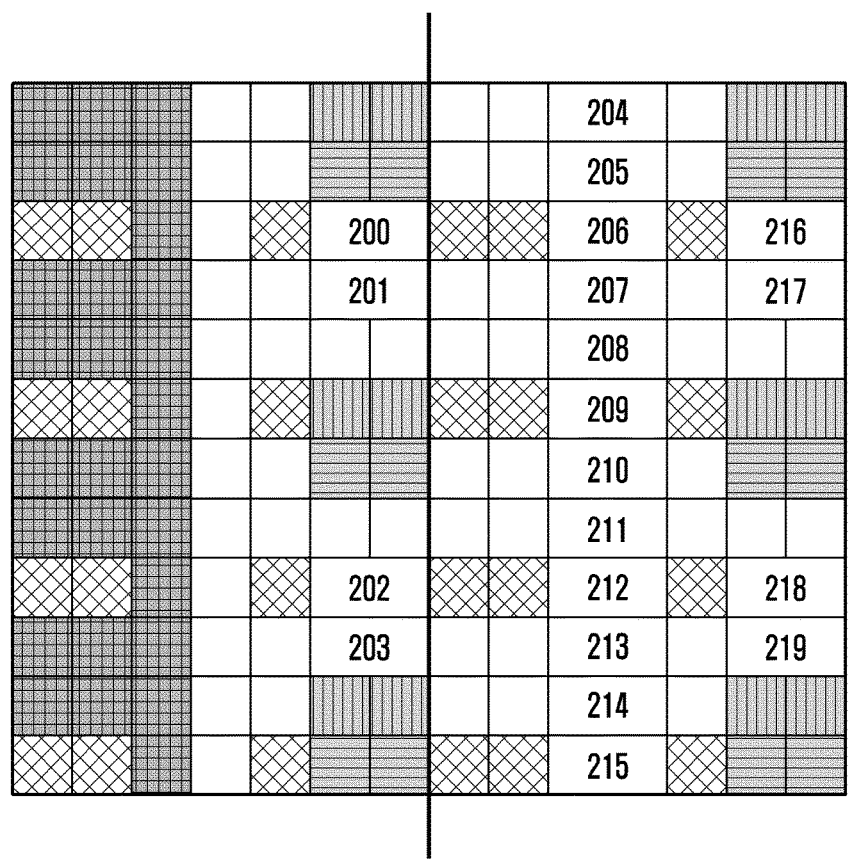
FIG. 3 illustrates positions of CSI-RSs within a resource block transmitted to a UE by an eNB in an LTE-A system, according to an embodiment of the present invention.

FIG. 3 illustrates an example of positions of CSI-RSs within a resource block transmitted to a UE by an eNB in an LTE-A system. Description of reference signals allocated to the resource block is given in FIG. 3 and more specific definitions thereof can be found in related standards of the LTE-A system.

Figure 1:
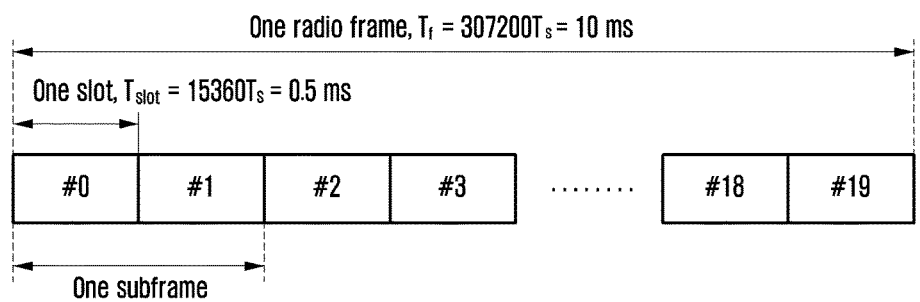
FIG. 1 illustrates a radio frame structure of an LTE-A system.
Figure 2:
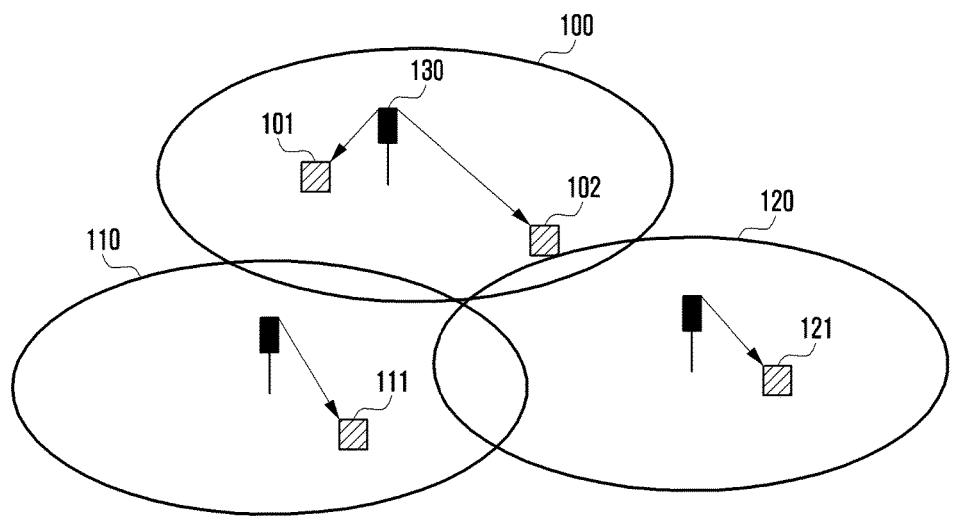
FIG. 2 illustrates a cellular mobile communication system according to the prior art in which a transmission/reception antenna is located in a center of each cell.

Referring to FIG. 3, signals for two CSI-RS antenna ports can be transmitted at each of the positions indicated by reference numerals 200 to 219. For example, an eNB transmits two CSI-RSs for downlink measurement to a UE at the position indicated by reference numeral 200. In the case of a cellular wireless communication system including a plurality of cells as shown in FIG. 2, positions within a resource block are separately allocated according to the cells, for transmission of CSI-RSs. For example, a CSI-RS may be transmitted at the position indicated by reference numeral 200 in the case of the cell 100 shown in FIG. 2, at the position indicated by reference numeral 205 in the case of the cell 110, and at the position indicated by reference numeral 210 in the case of the cell 120. Such allocation of time and frequency resources for CSI-RS transmission to different positions according to cells as described above prevents CSI-RSs of different cells from interfering with each other.

A sub-frame for transmission of a CSI-RS in a downlink is determined by a parameter $I_{CSI-RS}$ transferred by a Radio Resource Control (RRC) signal. Upon receiving $I_{CSI-RS}$, a UE determines a cycle $I_{CSI-RS}$ of a sub-frame for transmission of a CSI-RS and an offset $\Delta_{CSI-RS}$ of the sub-frame for transmission of the CSI-RS through Table 1 below.

TABLE 1

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Further, the terminal receives a CSI-RS at a sub-frame satisfying Equation (1) below.

$$(10n_f + \lfloor n_s/2 \rfloor - \Delta_{CSI-RS}) \bmod T_{CSI-RS} = 0 \quad (1)$$

In Equation ( ), $n_f$ indicates a transmission frame number and $n_s$ indicates a slot number in a transmission frame.

A cellular mobile communication system is established by constructing a plurality of cells in a limited area. In each cell, an eNB apparatus dedicated for mobile communication in the cell provides a mobile communication service to UEs within the cell. In this instance, a specific UE receives a mobile communication service supported by only one cell that has been semi-statically determined. Hereinafter, such a system is referred to as a non-CoMP system.

In a non-CoMP system, the high data transmission rate provided to all UEs existing in a cell largely changes according to the position at which the UE is located in the cell. That is, a UE located at the center of a cell can use a high data transmission rate while a UE located close to an edge of a cell is unable to use a high data transmission rate.

Conversely, in the CoMP system, a plurality of cells cooperate with each other to transmit data in order to support a UE located in a cell boundary area. Therefore, the CoMP system can provide an improved mobile communication service in comparison with the non-CoMP system.

The present invention proposes a method and an apparatus related thereto, by which eNBs can cooperate with each other in consideration of a Dynamic cell Selection (DS) scheme, a Dynamic cell selection with Dynamic Blanking (DB) scheme, a Joint Transmission (JT), and a combination of the three schemes in a CoMP system.

The DS scheme relates to a scheme in which a UE measures a cell-specific channel state and transfers a feedback relating to the measured state to an eNB and the eNB dynamically selects a cell for transmission of downlink data to the UE and then transmits the data.

The DB scheme relates to a scheme in which a particular cell does not transmit its own data in order to reduce interference to another cell.

Further, the JT scheme relates to a scheme in which multiple cells simultaneously transmit data to a particular UE.

The three CoMP schemes described above are compatible with each other, and they can be dynamically selected and used according to various situations. The present invention designs message structures between eNBs to enable efficient application of the DS scheme, the DB scheme, or the JT scheme to an LTE-A system, so as to solve the problems described above.

Figure 4:
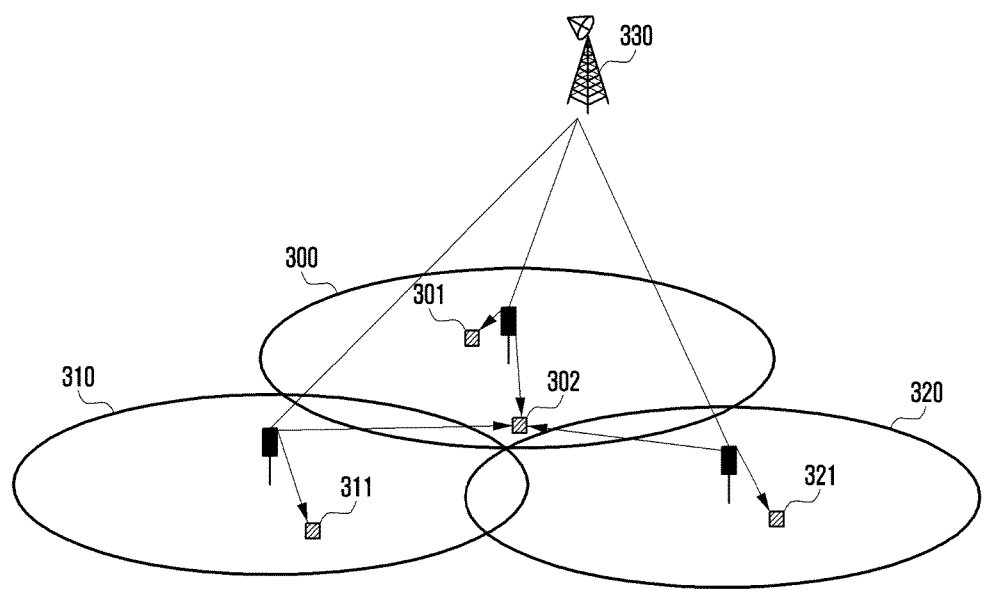
FIG. 4 illustrates a configuration of a cellular mobile communication system, according to an embodiment of the present invention.

FIG. 4 illustrates a configuration of a cellular mobile communication system according to an embodiment of the present invention.

The following description is based on an assumption that the cellular mobile communication system includes three cells. Further, in embodiments of the present invention, a cell refers to a data transmission area in which a particular transmission point can provide a service, each transmission point may be a Remote Radio Head (RRH) having a common cell IDentifier (ID) with a macro eNB within a macro area, and the cell may be a macro cell or a pico cell in which transmission points have different cell IDs.

A central controller refers to an apparatus for collecting feedback information on multiple cells from UEs, estimating channel/interference of multiple cells, or managing data transmission resources, in order to operate inter-cell cooperation. One of the multiple macro or pico eNBs participating in the cooperation may be configured as the central controller or a separate apparatus for integrally managing multiple macro or pico eNBs may be used. Further, in a particular macro cell area, e.g., when each transmission point is an RRH having a common cell ID with the macro eNB, the macro eNB may be configured and operated as a central controller.

Referring to FIG. 4, a cellular mobile communication system includes one or more cells 300, 310, and 320, UEs 301, 311, and 321, each of which receives data transmitted from the nearest cell, and a UE 302 receiving data through CoMP transmission from the cells 300, 310, and 320. Each of the UEs 301, 311, and 321 receiving data transmitted from the nearest cell can estimate a channel through a Channel Status Information-Reference Signal (CSI-RS) relating to a cell, in which it is located, and one particular interference measurement resource, and transmit a related feedback to a corresponding eNB. However, the UE 302, which receives data transmitted through a CoMP scheme from the three cells 300, 310, and 320, estimates channels from all of the three cells 300, 310, and 320 or measures multiple interferences according to an inter-cell cooperation scheme. That is, an eNB of the cell 300, which the data field 302 has accessed for channel estimation performed by the data field 302, allocates three CSI-RS resources corresponding to the cells or allocates a plurality of interference measurement resources in consideration of cooperation among the cells.

Therefore, the central controller 330 manages CSI-RSs and IMRs of cells participating in the CoMP operation and exchanges information with the cells so as to enable an eNB of the cell 300, which the UE 302 has accessed, to obtain information on a transmission resource of CSI-RSs for surrounding cells 310 and 320 or a resource for interference measurement relating to cooperative operations of surrounding cells. A method of allocating CSI-RSs and IMRs to the UE 302 is now described with reference to FIG. 5.

Figure 5:
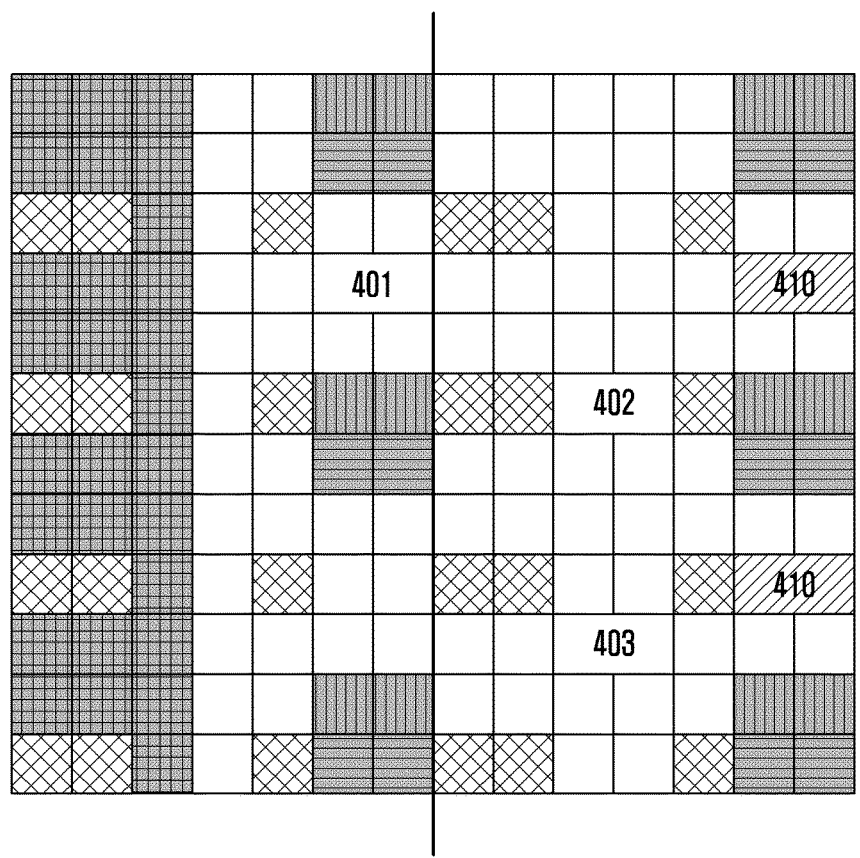
FIG. 5 illustrates positions of CSI-RSs within a resource block transmitted to a UE by an eNB, according to an embodiment of the present invention.

FIG. 5 illustrates positions of CSI-RS resources and Interference Measurement Resources (IMRs) transmitted to a UE by an eNB according to an embodiment of the present invention.

Referring to FIGS. 4 and 5, a central controller allocates three CSI-RSs to resources 401, 402, and 403 so as to enable the UE 302 receiving data through CoMP transmission to estimate channels from three cells 300, 310, 320, respectively, and each eNB transmits a CSI-RS by using the allocated resource.

That is, a CSI-RS for channel estimation of the cell 300 is allocated to a resource indicated by 401, a CSI-RS for channel estimation of the cell 310 is allocated to a resource indicated by 402, and a CSI-RS for channel estimation of the cell 320 is allocated to a resource indicated by 403.

In embodiments, a set including a resource to which at least one CSI-RS transmitted for channel estimation of a CoMP UE has been allocated or a set including a cell corresponding to the CSI-RS resource may be called a measurement set.

Further, an eNB of the cell 300 can allocate an additional resource for measurement of interference to the UE 302. The quantity of data per unit time which a UE can receive is influenced by the intensity of interference as well as the intensity of a signal. Therefore, a corresponding eNB can separately allocate an Interference Measurement Resource (IMR) dedicated for interference measurement of a UE so as to enable the UE to achieve exact interference measurement.

An eNB may allocate one IMR to one UE to enable the UE to measure the quantity of interference commonly applied to all CSI-RSs within a measurement set or may allocate multiple IMRs to one UE to enable the UE to measure various interference situations.

Referring again to FIG. 5, a UE can measure signals from three cells by using three CSI-RS resources 401, 402, and 403 allocated to the UE and can measure common interference generated when receiving a signal transmitted from the three cells by using the resource 410 which is an allocated IMR. In this instance, the central controller needs to control signal transmission of surrounding cells at the resource 410 so that the UE can precisely measure the intended interference at the resource 410.

As described above, in a CoMP situation, a UE is allocated a measurement set for multiple cells, is allocated one IMR or multiple IMRs, and generates and reports feedback information relating to a corresponding channel and interference situation. In this instance, in order to achieve an adequate CoMP operation, information of CSI-RSs and IMRs of multiple eNBs should be precisely shared through a central controller and the eNBs should be controlled such that exact channel and interference can be reflected in a corresponding resource.

An embodiment of the present invention relates to a system and method for supporting a CoMP operation and a method for exchanging information relating to IMRs and CSI-RS resources between an eNB and a central controller for supporting the same. In this embodiment, the present invention can be used to support a CoMP operation of a DB scheme.

Figure 6:
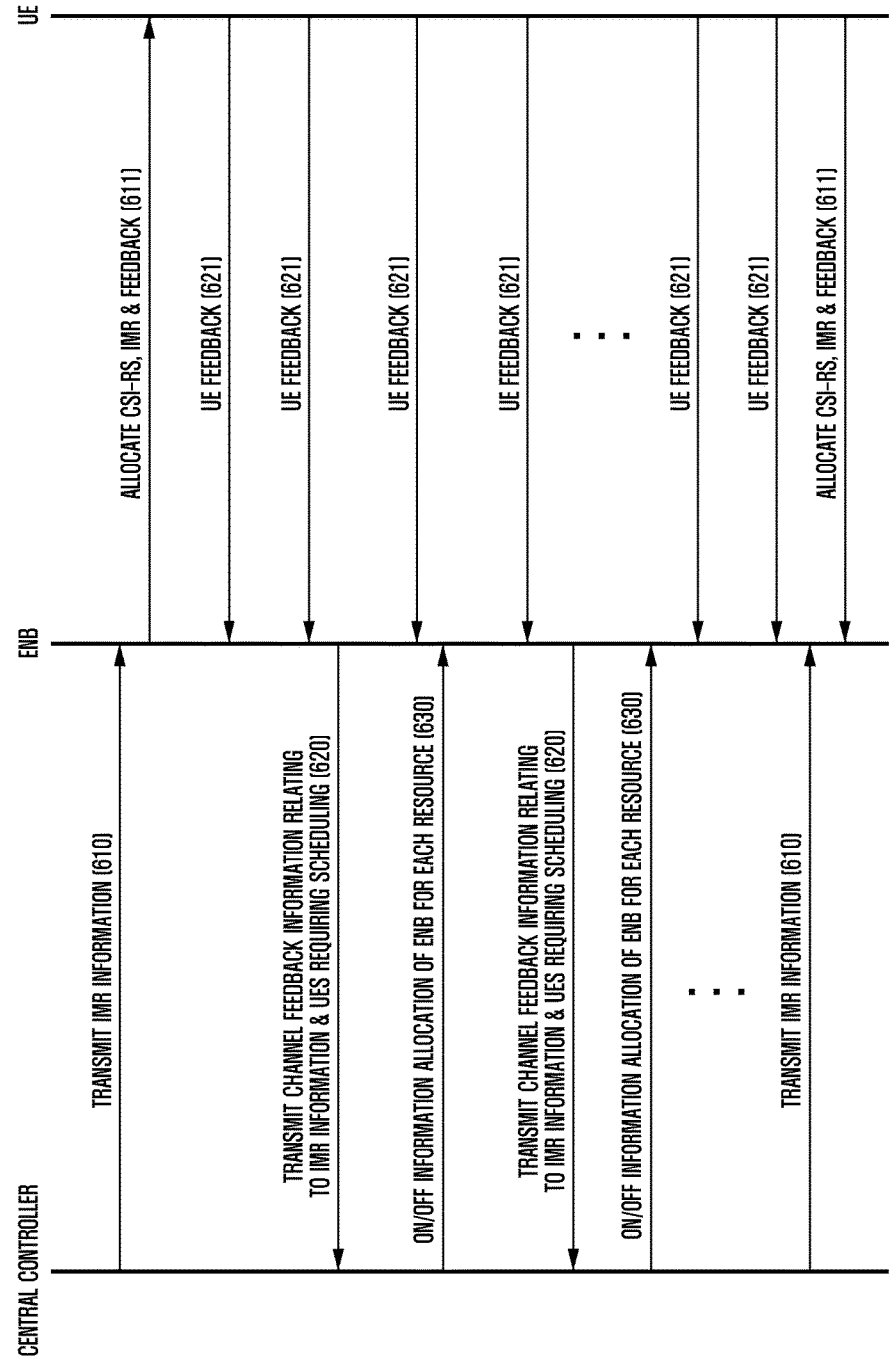
FIG. 6 is a signal flow diagram illustrating operations of a central controller, an eNB, and a UE, according to an embodiment of the present invention.

FIG. 6 is a signal flow diagram illustrating operations of a central controller, an eNB, and a UE according to an embodiment of the present invention.

Referring to FIG. 6, the first operation of the central controller according to the embodiment of the present invention corresponds to step 610 in which the central controller allocates IMRs to be used by cells participating in the CoMP operation and transmits information including a list of related interference situations, positions of the resources within an RB, and transmission timing information to each eNB.

The central controller determines interference situations necessary for N number of cells participating in a CoMP operation, determines at least one of time and frequency resources for transmission of IMRs respectively corresponding to the situations, and reports all or a part of the information for each of the IMRs determined by the N number of cells participating in the CoMP. The information that can be reported includes: operationIMR index, interference situation to a corresponding IMR, information on whether each cell is turned on or off in a corresponding cell; for example, N-bit bitmap information may be used to report ON or OFF situations of N number of cells, position information of a corresponding IMR within an RB, transmission timing information of a corresponding IMR, e.g., cycle, offset.

Based on an assumption that, for example, a central controller manages four cells, when it is determined that the central controller will allocate M number of IMRs, IMR allocation information reported to the four cells (including Cell 1, Cell 2, Cell 3, and Cell 4) may be configured by 4-bit bitmap reflecting interference situation, resource position within an RB of a corresponding IMR, and transmission timing information.

Examples of configurations of IMR allocation information may be as follows:

First IMR: interference situation (ON, ON, ON, ON), IMR position within a Resource Block (RB), IMR transmission cycle and offset information.

Second IMR: interference situation (ON, ON, ON, OFF), IMR position within an RB, IMR transmission cycle and offset information.

Third IMR: interference situation (ON, OFF, OFF, ON), IMR position within an RB, IMR transmission cycle and offset information.

$M^{th}$ IMR: interference situation (OFF, OFF, OFF, ON), IMR position within an RB, IMR transmission cycle and offset information.

Further, according to a first method of the present invention in which the central controller determines interference situations necessary for N number of cells participating in a CoMP operation at step 610, the central controller receives a request for necessary interference situation information from each of the N number of eNBs and then determines an index and a transmission resource of each of IMRs determined to be necessary for the cooperation based on the request. In this instance, the interference situation information request of each eNB may have a form of N-bit bitmap as the interference situation reported to a UE or an eNB by the central controller. In accordance with the first method, a step of transmitting an interference situation request from an eNB to the central controller may be added before step 610.

According to another method by which the central controller determines interference situations necessary for N number of cells participating in a CoMP operation, the central controller may notify an eNB of a list of corresponding IMRs in consideration of both ON/OFF states for only the cells having traffic among the N number of cells. That is, in this method, if L number of eNBs among the N number of eNBs currently have downlink traffic, the central controller allocates IMRs to all the (2L−1) number of ON and OFF states except for the situation in which all the eNBs are off, and reports it to the eNBs. L may have a value smaller than or equal to N or L and N may be configured to always have the same value.

The eNBs having received a list of IMRs to be used for the cooperation from the central controller can determine ON-OFF situations of the eNBs at a corresponding time-frequency position according to an interference situation indicated by the list so that proper interference can be reflected in the time-frequency position of the corresponding IMR.

The second operation of the central controller according to the embodiment corresponds to step 630 of FIG. 6 in which the central controller determines a data resource of each cell capable of minimizing interference between the cells participating in the cooperation and allocates/reports corresponding data resource information to each eNB.

The data resource information of each cell in step 630 corresponds to information on a downlink frequency resource usable by each cell in a particular sub-frame and may be configured with bitmap information in which each bit indicates whether a particular frequency resource is usable. The unit of the frequency resource may be an RB or an RB group including a plurality of RBs.

Figure 7:
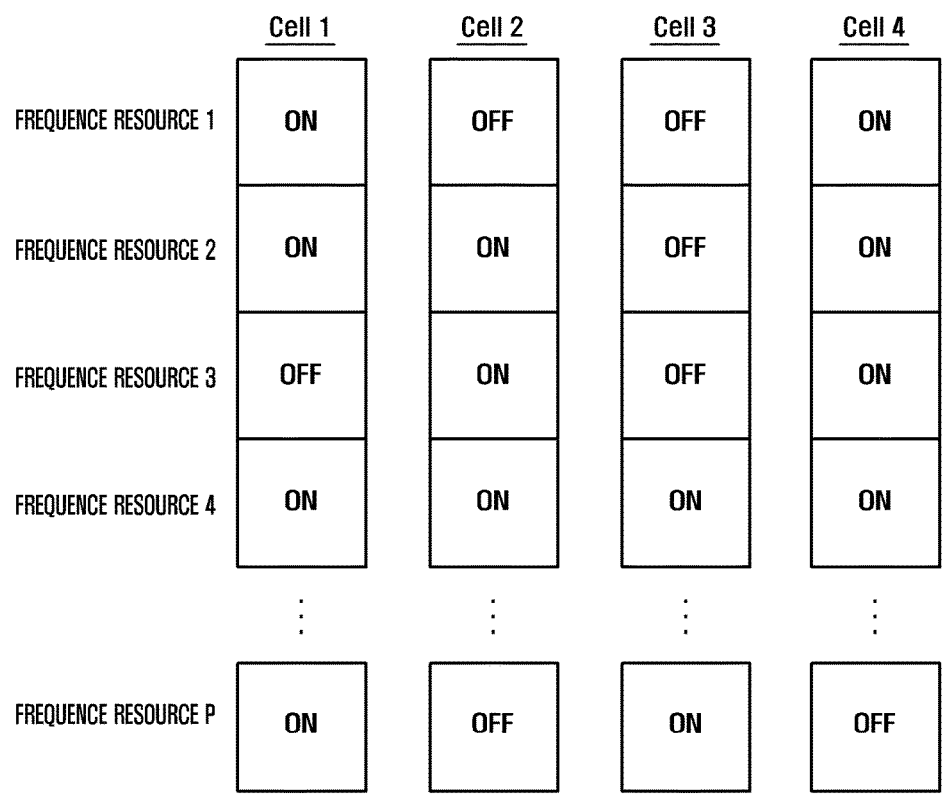
FIG. 7 illustrates an example of bitmap information indicating downlink frequency resources usable by respective cells in a sub-frame, according to an embodiment of the present invention.

FIG. 7 illustrates an example of data resource information having a form of bitmap for each cell. If the central controller manages four cells (Cell 1, Cell 2, Cell 3, and Cell 4), the central controller reports whether each frequency resource can be used as a data resource to each cell through bitmap information, as shown in FIG. 7. Then, each eNB performs downlink data information scheduling to a UE of a corresponding cell for frequency resources configured to ON. That is, when the eNB of Cell 1 identifies data resource information as shown in FIG. 7, the eNB transmits downlink data information to a UE by using frequency resources 1, 2, 4, . . . , and P configured to ON while it does not perform data transmission in frequency resource 3 and configured to OFF in order to prevent generation of interference to another cell.

In order to determine a data resource of each cell capable of minimizing interference between the cells participating in the cooperation at step 630, the central controller needs to identify downlink channel information between an eNB and a UE according to various ON-OFF situations of cooperative cells. Therefore, principal functions of the eNB of each cell according to an embodiment of the present invention are to allocate CSI-RSs and IMRs reflecting proper signal and interference situations to UEs having accessed a corresponding cell (see step 611 of FIG. 6), to receive downlink channel information feedback from the UEs (see step 621 of FIG. 6), and to transmit the downlink channel information to the central controller (see step 620 of FIG. 6). The central controller can determine data resource of each cell capable of minimizing interference between cells participating in the cooperation based on the information transmitted at step 620.

Functions of an eNB according to an embodiment of the present invention will now be described in more detail with reference to FIG. 6. At step 611, the eNB allocates CSI-RSs for channel estimation and IMRs for interference estimation to UEs of a corresponding cell. In this embodiment, it is assumed that a UE receives downlink data transmission from a cell which the UE has accessed since a CoMP situation through the DB scheme is used in this present embodiment. Therefore, the eNB allocates CSI-RSs corresponding to its own cell to a UE and allocates a plurality of IMRs, which correspond to interference relating to ON-OFF situations of cells determined as large interference to the UE, to the UE. Then, at step 621, the UE generates feedback relating to the ON-OFF situations of interference cells having a large influence and sends the feedback to the eNB. For example, in the instance in which four cells cooperate with each other as described above, an eNB of cell 1 allocates two IMRs corresponding to (ON, ON, ON, ON) and (ON, OFF, ON, ON) to a UE, which is determined to be subject to large interference from cell 2, so as to enable the UE to identify the interference from cell 2, and allocates a CSI-RS of cell 1 to the UE, so that cell 1 can receive downlink channel information fed back from the UE relating to the situations in which cell 2 is turned off or on. Further, in the same situation, the eNB of cell 1 allocates two IMRs corresponding to (ON, ON, ON, ON) and (ON, ON, OFF, ON) to a UE, which is determined to be subject to large interference from cell 3, so as to enable the UE to identify the interference from cell 3, and allocates a CSI-RS of cell 1 to the UE, so that cell 1 can receive downlink channel information fed back from the UE relating to the situations in which cell 2 is turned off or on.

The eNB having acquired channel feedback information of UEs relating to various interference situations through steps 611 and 621 of FIG. 6, transfers information on UEs requiring scheduling and corresponding channel feedback information to the central controller at step 620. That is, the message transferred to the central controller at step 620 includes a part or all of the following information: Information on the sub-frame for transferring the message; Information on the number of UEs requiring scheduling; Interference situation index and corresponding channel feedback information of each UE requiring scheduling; First UE including: (IMR index 1, corresponding channel feedback information); and (IMR index 2, corresponding channel feedback information); Second UE including: (IMR index 1, corresponding channel feedback information); and (IMR index 2, corresponding channel feedback information); and $Q^{th}$ UE including: (IMR index 1, corresponding channel feedback information); and (IMR index 2, corresponding channel feedback information).

Among the message information, the IMR index corresponds to one of the indexes of IMRs reported to the UEs by the central controller at step 610 and enables the central controller to identify a corresponding interference situation of feedback information transferred by the eNB. Further, the channel feedback information may include rank information (e.g., Rank Indicator; RI), precoding information (e.g., Precoding Matrix Indicator; PMI), and channel state information (e.g., Channel Quality Indicator; CQI), and may further include downlink power information, etc.

Through the operation of the UE corresponding up to step 621 and the operations of the eNB corresponding up to steps 611 and 620, the central controller can identify downlink channel information between the eNB and the UE according to various ON-OFF situations of the cooperative cells and can determine data resources of each cell capable of minimizing the interference between cells participating the cooperation based on the identified information.

Although the above description on the process of message transmission among the central controller, the eNB, and the UE is based on an assumption that one CSI-RS and one or more IMR are allocated to the UE for its operation in consideration of the DB scheme; the present invention is not limited to this assumption. In the case of the DS or JT scheme, it may be necessary for the central controller to control not only a plurality of IMRs but also a plurality of CSI-RS resources. In this instance, as the IMR information is shared between the central controller and the eNB as shown in FIG. 6, a list of CSI-RS information may reported to eNBs by the central controller according to the transmission timing and resource positions determined by the central controller.

Figure 8:
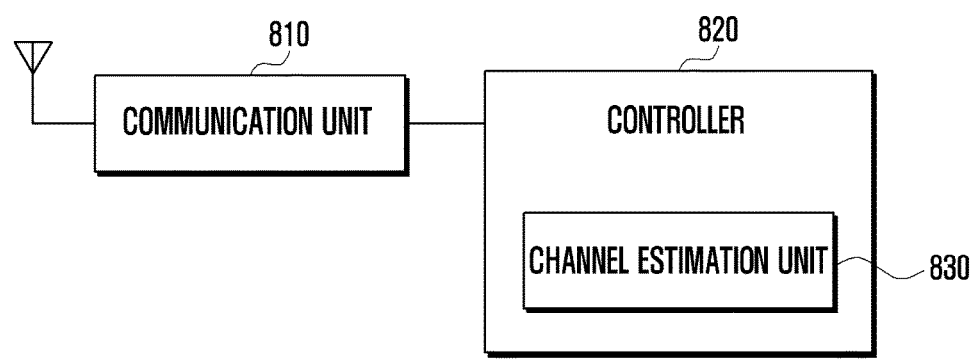
FIG. 8 is a block diagram illustrating a configuration of a UE, according to an embodiment of the present invention.

FIG. 8 is a block diagram illustrating a configuration of a UE according to an embodiment of the present invention.

Referring to FIG. 8, the UE includes a communication unit 810 and a controller 820.

The communication unit 810 transmits or receives data to or from the outside, e.g., a base station. The communication unit 810 transmits channel information for CoMP technology to the central controller under the control of the controller 820.

The controller 820 controls states and operations of all elements of the UE. The controller 820 selects feedback information for a cooperative communication according to the information currently shared between the UE and the cell and can provide feedback on the channel information on an interference measurement resource and an allocated signal to the central controller. To this end, the controller 820 includes a channel estimation unit 830.

The channel estimation unit 830 determines necessary feedback information through measurement set-related information received from the central controller and then estimates a signal and interference by using the received CSI-RS and IMR. Further, the channel estimation unit 830 may feed channel information relating to CoMP back to the central controller 820 by controlling the communication unit 810.

Although the configuration of the UE illustrated in FIG. 8 is based on an assumption that a UE is configured by the communication unit 810 and the controller 820, the present invention is not limited to such a configuration. That is, the UE may further include various elements according to the functions executed by the UE. For example, the UE may include a display unit for displaying a current state of the UE, an input unit through which a signal for execution of a function is input by a user, and a storage unit for storing data generated in the UE.

Figure 9:
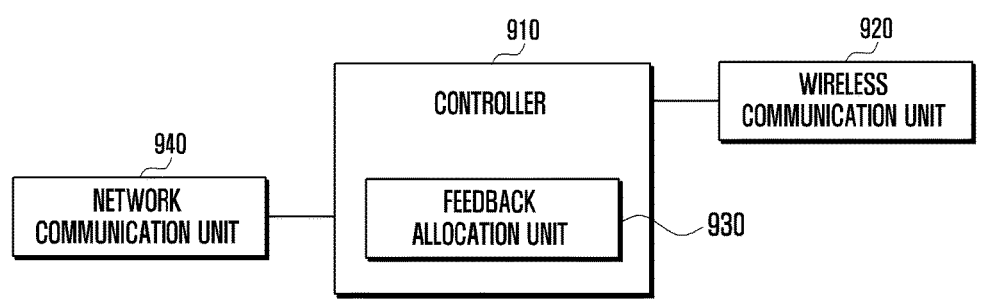
FIG. 9 a block diagram illustrating a configuration of an eNB, according to an embodiment of the present invention.

FIG. 9 is a block diagram illustrating a configuration of an eNB according to an embodiment of the present invention.

Referring to FIG. 9, the eNB includes a controller 910, a wireless communication unit 920, and a network communication unit 940.

The controller 910 controls states and operations of all elements of the eNB. The controller 910 maps CSI-RSs and IMRs for channel estimation of a UE to corresponding resources, respectively. To this end, the controller 910 includes a feedback allocation unit 930.

The feedback allocation unit 930 maps a CSI-RS and an IMR to each resource to enable a UE to estimate each channel and transmits the CSI-RS and the IMR by using the corresponding resource. The resources for the CSI-RS and the IMR are allocated to correspond to positions of the CSI-RS and the IMR for channel estimation of each cell with reference to a resource list reported by the central controller. Further, the feedback allocation unit 930 performs signal control to reflect a proper interference through the IMR. Further, the feedback allocation unit 930 configures a proper CSI-RS and a proper IMR for each UE to enable a necessary signal and interference situation to be reflected well in the feedback information.

The wireless communication unit 920 transmits or receives a feedback and data to or from a UE. Further, the network communication unit 940 receives information on data resource allocation and a list of CSI-RSs and IMRs reported by the central controller and/or transfers channel information acquired from the UE to the central controller.

Figure 10:
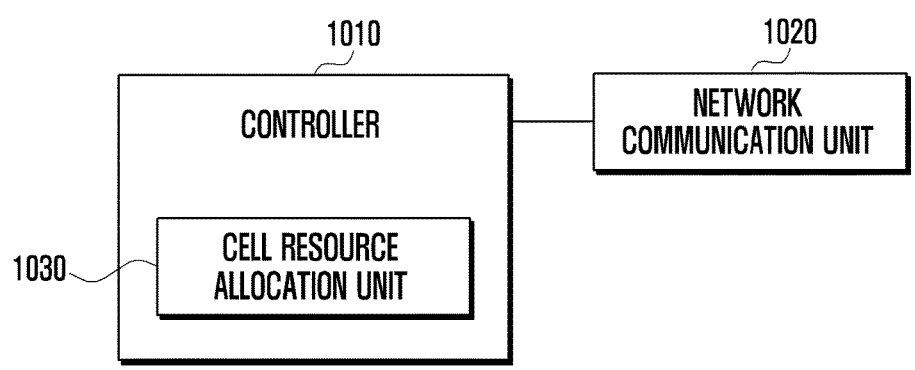
FIG. 10 is a block diagram illustrating a configuration of a central controller, according to an embodiment of the present invention.

FIG. 10 is a block diagram illustrating a configuration of a central controller according to an embodiment of the present invention.

Referring to FIG. 10, the central controller includes a controller 1010 and a network communication unit 1020.

The controller 1010 controls states and operations of all elements of the central controller. The controller 1010 allocates an IMR list for cooperating cells and CSI-RSs of respective cells for channel estimation of a UE and identifies feedback information, so as to allocate a data resource of each cell. To this end, the controller 1010 includes a cell resource allocation unit 1030.

The cell resource allocation unit 1030 allocates a CSI-RS to each resource, allocates an IMR list and corresponding resources to be used in cooperative cells, and allocates a data resource of each cell, to enable a UE to estimate a channel of each cell.

The network communication unit 1020 transmits or receives information on a cell managed by a UE or itself, resource allocation information, and feedback information.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method by a base station in a communication system, the method comprising:

receiving, from a control device, first information related to a resource, the first information including a bitmap and information on available downlink resource index for the base station, the bitmap indicating a resource index and information on scheduling for downlink data corresponding to at least one other base station corresponding to the resource index;

identifying a resource related to channel information for at least one terminal based on the first information, the resource being identified based on amount of interference of the at least one other base station;

transmitting, to the at least one terminal, second information on the resource related to the channel information based on the first information, the second information including information on an offset and cycle related to the resource;

receiving, from the at least one terminal, channel information based on the second information; and transmitting, to the control device, information on a number of terminals for which scheduling is required and channel feedback information corresponding to each of the terminals based on the received channel information, the channel feedback information including downlink transmission power information for the each of the terminals.

2. The method of claim 1, wherein the channel feedback information comprises information on an interference related to the base station and the at least one other base station at the resource related to the channel information for the at least one terminal.

3. The method of claim 2, wherein the information on the interference comprises a bitmap corresponding to the base station and the at least one other base station.

4. The method of claim 1, wherein the second information on the resource related to the channel information comprises a location of the resource related to the channel information for the at least one terminal.

5. The method of claim 1, further comprising:

receiving third information on a scheduling related to the base station and the at least one other base station from the control device; and transmitting, to a second terminal, scheduling information for the second terminal of the at least one terminal based on the received third information.

6. A base station in a communication system, the base station comprising:

a transceiver configured to transmit and receive at least one signal; and a controller coupled with the transceiver and configured to:

receive, from a control device, first information related to a resource, the first information including a bitmap and information on available downlink resource index for the base station, the bitmap indicating resource index and information on scheduling for downlink data corresponding to at least one other base station corresponding to the resource index, identify a resource related to channel information for at least one terminal based on the first information, the resource being identified based on amount of interference of the at least one other base station, and control the transceiver for transmitting, to the at least one terminal, second information on the resource related to the channel information based on the first information, the second information including information on an offset and cycle related to the resource, receiving, from the at least one terminal, channel information based on the second information and transmitting, to the control device, information on a number of terminals for which scheduling is required and channel feedback information corresponding to each of the terminals based on the received channel information, the channel feedback information including downlink transmission power information for the each of the terminals.

7. The base station of claim 6, wherein the channel feedback information comprises information on an interference related to the base station and the at least one other base station at the resource related to the channel information for the at least one terminal.

8. The base station of claim 7, wherein the information on the interference comprises a bitmap corresponding to the base station and the at least one other base station.

9. The base station of claim 6, wherein the second information on the resource related to the channel information for the at least one terminal comprises a location of the resource related to the channel information for the at least one terminal.

10. The base station of claim 6, wherein the controller is further configured to control the transceiver for receiving third information on a scheduling related to the base station and the at least one other base station from the control device, and transmitting, to a second terminal, scheduling information for the second terminal of the at least one terminal based on the received third information.

11. A terminal in a communication system, the terminal comprising:

a transceiver configured to transmit and receive at least one signal; and a controller coupled with the transceiver and configured to control the transceiver for:

receiving, from a base station, the first information on a resource related to channel information being identified based on a bitmap and information on available downlink resource index for the base station, the bitmap indicating resource index and information on scheduling for downlink data corresponding to at least one other base station corresponding to the resource index acquired form a control device, wherein the resource is identified based on amount of interference of the at least one other base station and the first information including information on an offset and cycle related to the resource, and transmitting, to the base station, second information including channel feedback information identified based on the first information, wherein third information including information on a number of terminals for which scheduling is required and the channel feedback information corresponding to each of the terminals is transmitted from the base station to the control device based on the second information, the channel feedback information including downlink transmission power information for the each of the terminals.

12. The terminal of claim 11, wherein the channel feedback information comprises information on an interference related to the base station and the at least one other base station at the resource related to the channel information for the terminal.

13. The terminal of claim 12, wherein the first information comprises a bitmap corresponding to the base station and the at least one other base station.

14. The terminal of claim 11, wherein the first information on the resource related to the channel information for the terminal comprises a location of the resource related to the channel information for the terminal.

15. The terminal of claim 11, wherein the controller is further configured to control the transceiver for receiving, from the base station, scheduling information for the terminal based on the third information.

16. A control device in a communication system, the control device comprising:
- a transceiver configured to transmit and receive at least one signal; and
- a controller coupled with the transceiver and configured to control the transceiver for transmitting, to a base station, first information related to a resource, the first information including a bitmap and information on available downlink resource index for the base station, the bitmap indicating resource index and information on scheduling for downlink data corresponding to at least one other base station corresponding to the resource index, and
- receiving, from the base station, request message including information on a number of terminals for which scheduling is required and channel feedback information corresponding to each of the terminals, the channel feedback information including a downlink transmission power information for the each of the terminals,
- wherein a resource related to channel information for the at least one terminal is identified based on the first information and amount of interference of the at least one other base station,
- wherein second information on the resource related to the channel information including information on an offset and cycle related to the resource is transmitted from the base station to the at least one terminal based on the first information,
- wherein channel information is transmitted from the at least one terminal to the base station based on the second information, and
- wherein the request message is identified based on the channel information acquired from the at least one terminal.

17. The control device of claim 16, wherein the channel feedback information on an interference related to the base station and the at least one other base station at the resource related to the channel information for the at least one terminal.

18. The control device of claim 17, wherein the information on the interference comprises a bitmap corresponding to the base station and the at least one other base station.

19. The control device of claim 16, wherein the second information on the resource related to the channel information comprises a location of the resource related to the channel information for the at least one terminal.

20. The control device of claim 16, wherein the controller configured to control the transceiver for transmitting third information on a scheduling related to the base station and the at least one other base station, and
wherein scheduling information for a second terminal of the at least one is transmitted from the base station to the second based on the third information.

* * * * *